FIG. I

Patented Apr. 2, 1940

2,195,911

UNITED STATES PATENT OFFICE 2,195,911

SELECTIVE WORM GEAR TABLE DRIVE

William F. Zimmermann, Maplewood, N. J., assignor to Gould & Eberhardt, Newark, N. J., a corporation of New Jersey Application April 5, 1939, Serial No. 266,080

36 Claims. (Cl. 74—428)

The present invention relates to worm gearing and concerns more particularly an improved worm gear drive for a rotary work support of a character such as used in connection with the hobbing of gears.

In a gear hobbing machine, great accuracy is required in the cordinate movements of the work and the cutter in order to produce gears having the high degree of precision essential to insure quiet running at high speeds with a minimum degree of wear. And such gears cannot be manufactured within the desired limits of accuracy in tooth form and spacing, unless the table of the hobbing machine is itself comparatively free from error in its revolutions. A primary aim of the present invention is to render available a worm drive capable of producing a greater degree of accuracy in table movements, than has heretofore been attainable.

Another object of the invention is to eliminate the error in table movements incident to making an adjustment in the drive to compensate for wear, by the provision of a simple means whereby, for example, the necessity for changing the axial center distances between worm and worm wheel, or the making of complex adjustments to balancing or double drives, is entirely eliminated.

The invention further aims to avoid harmful backlash heretofore present in worm drives, and to render available a reversible drive in which the worm may remain fully and properly meshed with its gear so that the table may be driven in either direction without backlash or without making any of the heretofore necessary complex adjustments to the worm or other elements of the prior type drives in an attempt to eliminate or transpose the existing backlash.

Still a further aim of the invention is to render available an improved selective drive for a work table embodying two sets of worm wheels and power driven worm gears meshing therewith, so constructed and arranged, however, that only one of the sets of worm gear elements may constitute the driving agency at any given time. The invention further proposes, that during the effective operation of one of the worm sets, the other set is to run idle and load-free, thereby not only to apportion the amount of work done and power transmitted between two different trains, but to preserve as long as possible the initial accuracy of each of the worm trains.

The invention further aims definitely to eliminate in a simple manner undue wear upon the teeth of the worm and worm wheel of the idle set when its companion set is being used as the driving agency.

Another objective of the invention is to eliminate to the greatest extent possible, the error produced in workpieces by reason of the cyclic error usually existing in ordinary worm drives, and to that end it is proposed that one of the gear sets be used exclusively as the finishing worm gear set, and that set constructed with a relatively large number of teeth of fine pitch, and to give its complementary driving worm a relatively high speed as compared with the speed of revolution of the worm of the other set which is of standard pitch and used for roughing operations. That is, to provide a selective drive arranged in a manner whereby uniform and equal table speeds may be produced with fine and coarse worms driven in synchronism at relatively fast and slow speeds.

During the finishing operation on gears, the highest order of precision in tooth form and spacing is required, and by arranging the finishing drive with a finely pitched worm and gear, for use exclusively when taking the more delicate finishing cuts on the work blank, any cyclic error that might exist in the drive is reduced to minimum proportions and, furthermore, averaged and distributed over a relatively large area.

Still another objective of the invention is to avoid complex mechanisms such as double or compound drives and balanced drives and their attendant disadvantages and difficulties, and to render available a work table and drive construction embodying the fewest number of parts, sturdily made and adaptable for the true turning of gears approximately twelve feet or more in diameter. By way of additional improvement the invention aims toward a construction in which each part is simple in design and relatively inexpensively made, and which may thereafter be easily assembled with infinite accuracy in proper working relation with each other and to the main transmission of the hobbing machine, and subsequently conveniently and accurately adjusted to suit the particular operation or condition at hand.

In attaining the objectives of the invention, it is proposed to embody in the drive of a hobbing machine work table, at least two table secured worm gear wheels co-axially related, and to mesh therewith two power driven worm gears. Each worm gear is journaled in bearings at the correct and invariable center distance from the axis of its associated worm wheel and is constructed with a thread that progressively decreases in axial thickness from one end to the other. That is, one end of each of the worms starts with an undersized or thin thread which progressively increases in axial thickness toward its other end, and terminates in an oversized or relatively thick thread.

The worm gears so constituted, are arranged permanently to mesh with their respective gears and with the thinner portion of the thread of one, preferably axially opposite the thicker portions of the thread of the other. Relatively movable thrust bearings are provided for each worm gear, and by moving the bearings and gears collectively in the direction of their axes, the thinner portions of one of the worms continues in mesh with its gear but definitely in spaced relation, while the thicker portions of the other is brought into driving contact with its ear. By shifting the worm gears axially, the driving load may thus be positively removed from one and shifted to the other without displacing the axial center distances of either worm.

As herein above indicated, it is proposed to construct the gear sets with relatively coarse and fine teeth, the coarse set for roughing and the fine set for finishing operations. And by driving the worms in synchronism, at rates corresponding to the ratio of the coarse and fine pitched gears, even though one worm turns at a relatively slow speed and the other at a relatively high speed, only one acts as the driver at any given time, while the other is caused to revolve idly, load-free and out of tooth contact with the teeth of its related worm wheel. In this manner the idly rotating worm is not only relieved of the driving load and any fractional part thereof, but is also definitely positioned out of contact with the teeth of its associated worm wheel. Accordingly, wearing of the parts when running idle, is definitely precluded and the original accuracy of the worm and worm wheel drive is preserved.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which.

Figure 1:
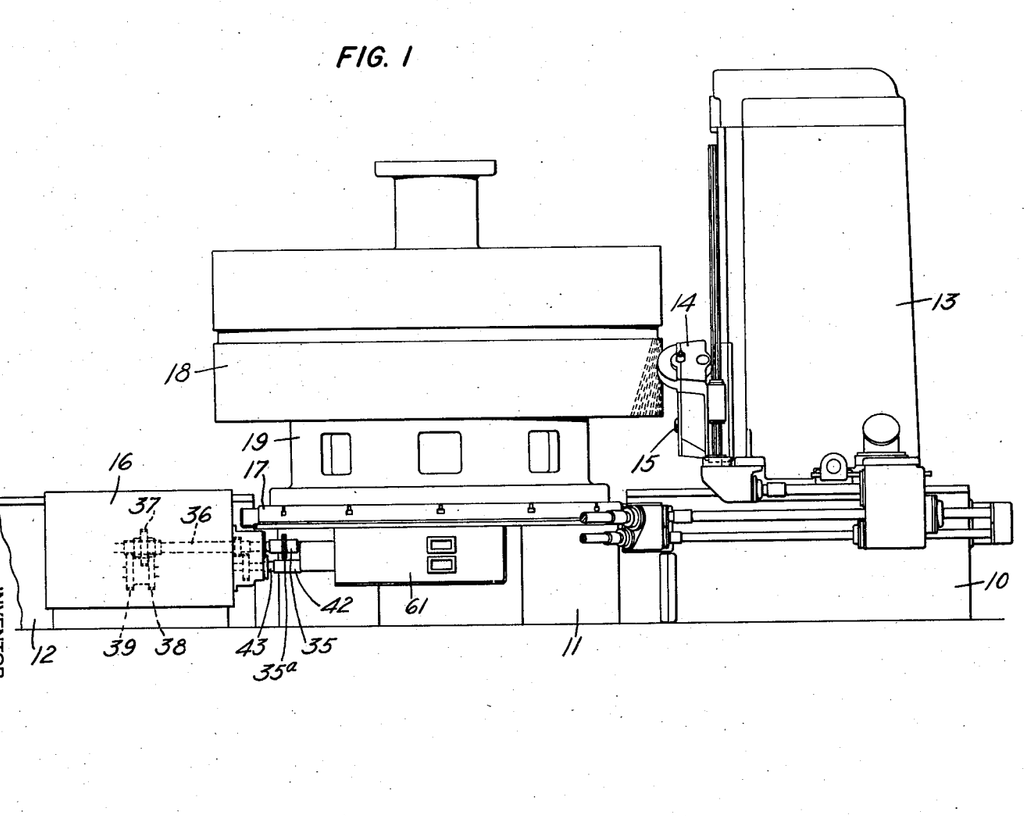
Figure 1 is a rear view of a gear hobbing machine embodying the present invention.

Referring more particularly to Fig. 1, the hobbing machine illustrated comprises a multi-part base member 10, 11, and 12. The bases 10 and 12 are stanchion bases and have translatably mounted on the top thereof upstanding stanchions 13 (only one of which is shown) on which is mounted for vertical movement a cutter carriage 14. The cutter carriage 14 supports a rotatable hob 15 which may receive its power in the instant case from a gear box 16. The intermediate base 11 provides the support and bearing means for a rotatable work table 17 upon which one or more workpieces 18 may be mounted and revolved. Usually a work fixture 19 is employed to hold the work piece in its proper relation to the cutter of the hobbing machine. The work table is slowly rotated in synchronism with the movements of the hob as the hob is slowly fed axially along the periphery of the blank until the desired length of tooth has been cut upon the blank all the way around.

It will be apparent that any error that exists or creeps into the table propelling drive is at once reflected in the tooth form and spacing of the teeth that are being cut upon the periphery of the blank and the greatest of care is necessary in the construction of a table drive to insure true running and the consequent production of accurate gears capable of being driven at relatively high speeds without noise or appreciable wear.

Heretofore various expedients have been resorted to in the attempt to provide a table drive free from error, among which are compound or double drives and tandem forms of drives. In such drives one or the other of the elements ultimately propelling the table was usually spring pressed or otherwise preloaded against the other. The aim being, to divide the driving load simultaneously between at least two trains, while at the same time hold out the backlash normally present and to average and distribute the error, that existed in the drive, over a greater range of teeth. Such drives, however, were usually very complex and costly in their nature and do not, moreover, offer a practical solution to the problem.

The hobbing machine work table must be adapted for movement in either direction for the cutting of right or left hand helical gears, and in the prior compound or tandem drives the location and direction of backlash is transposed immediately upon reversing. In such constructions the backlash eliminating features of the drive had to be adaptable for either direction of table movement and, in any event, complicated adjustments of various elements in the drive by highly skilled mechanics became necessary every time the table movements were reversed.

Moreover, with the worm drives heretofore used, whether compounded or single, considerable difficulty has been experienced in the mounting of the worms at the correct axial center distance relative to the center of the worm wheel in properly relating the teeth thereof for a definite predetermined table speed. And, when the proper relation had been established in a new machine, it was not long before the continual wear between the teeth of the worm and its worm wheel, introduced errors and accentuated the backlash, and it was only by tediously relocating the axial center distances of the worm and worm wheel, that the parts could be restored to their original accuracy or approximately so.

The aim of the present invention is to overcome the difficulties encountered in prior machines and to eliminate their disadvantages by an improved form of table drive and mounting. As illustrated more particularly in Figs. 4 and 5 of the drawings, the table member 17 is journaled on a central hollow pintle 20 which is secured in its proper vertical position on the base 11. Outside of the central stud, annular bearing surfaces 21 and 22 are formed on the table and base for taking all of the vertical thrusts upon the work table. And outside of the vertical thrust bearing surfaces, two worm wheel gears 30, 31 are secured to the under surface of the table in coaxial alignment. Constantly in mesh with the teeth of the worm wheels, two worm gears 32 and 33 are provided (only one of which, as will hereinafter be explained) may be used as the drive at any one time.

Figures 2, 3, 4:
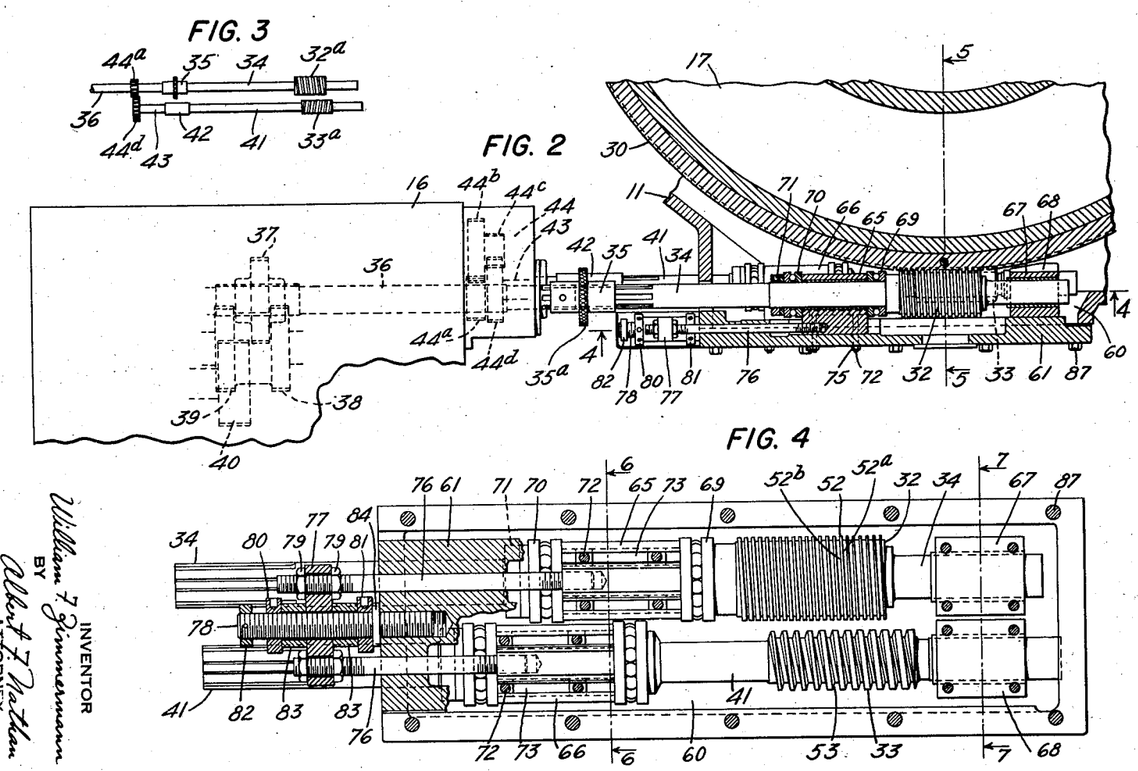
Fig. 2 is a plan view partly in section to illustrate more clearly portions of the table driving mechanism.
Fig. 3 is a schematic drawing of an alternative form of drive.
Fig. 4 is a vertical sectional view of the table drive taken substantially along the line 4—4 of Fig. 2.
Figure 5:
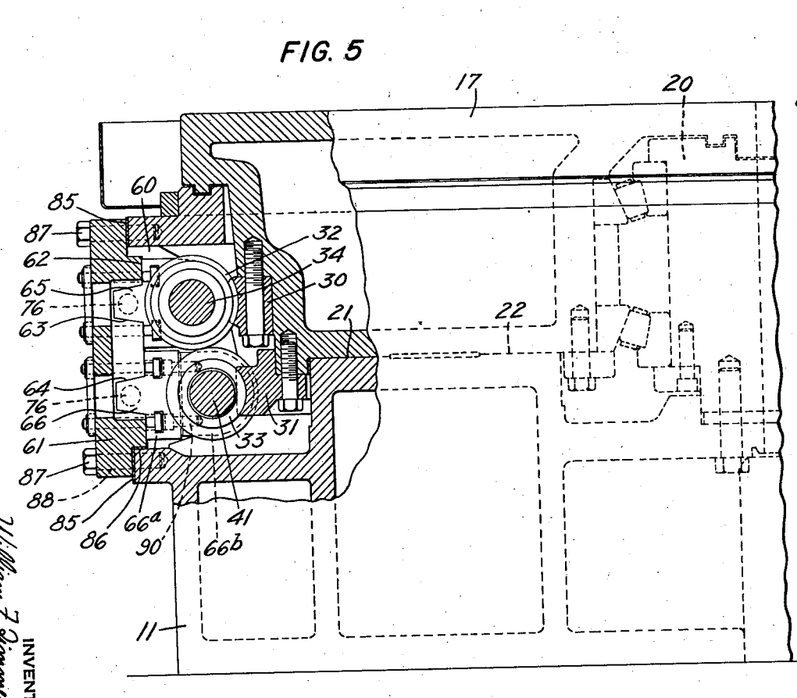
Fig. 5 is a vertical sectional view of the table drive taken along line 5—5 of Fig. 2.
Figure 6:
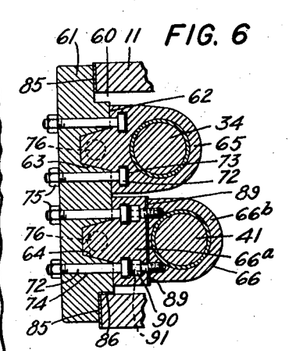
Figs. 6 and 7 are vertical sections through lines 6—6 and 7—7 of Fig. 4 illustrating more clearly the mounting of the bearings for the worm drive shafts.

It is proposed that one of the worm gear sets constitute the sole driving agency during the operation of the roughing out the gear blank, and the other set constitute the sole driving agency during the operation of finishing the tooth profile on the roughed out gear blank. In order to produce a gear with a greater degree of accuracy than heretofore obtainable, it is further proposed to give the upper gear set 30, 32, which constitutes the finishing gear set, a relatively large number of teeth, of fine pitch. In the present instance the upper gear 30 is provided with approximately three times the number of teeth as the lower gear 31 which is standard, thereby to reduce to minimum proportions any cyclic error that may exist in the finishing worm drive. The lower gear 31 and worm gear 33 is relatively coarse pitched and has a relatively few number of teeth. This worm set is to be used as the drive for the heavier and more severe roughing out operations which do not require such a high degree of accuracy and precision.

As herein before mentioned, both of the worms 32 and 33 are constantly in mesh with their associated worm wheels and each is driven at the relative speed required with due regard to their tooth radio. For example, if the finishing gear has three times the number of teeth than the roughing gear 31, the finishing worm 32 will be driven three times as fast as the roughing worm 33, and thereby produce the same table speed.

The finishing worm 32 is mounted upon a shaft 34 which has a telescoping connection 35 with a shaft 36 that extends into the gear box 16. Inside the gear box 16, the shaft 36 has mounted thereon a sliding gear 37 that meshes selectively with an idler gear 38 and a gear 40 of the main transmission. A gear 38 is one of a compound gear set which includes a gear 39 that also meshes continuously with the driving gear 40. Thus, by shifting the sliding gear 37 to the left or to the right from the position shown in Fig. 2, the finishing worm shaft 36 may be driven directly through gear 40 or in the reverse direction through gears 40, 39, and 38. In this way the finishing worm shaft receives its power from the main hobbing machine transmission selectively in reverse directions and at a rate of speed commensurate with the rate required to propel the table in complete synchronism with the movements of the hobbing cutter.

The roughing worm 33 receives its power from the same source but at a greatly reduced rate proportionate to the ratio of the teeth of the fine and coarse gear wheels 30, 31. The worm 33 is mounted upon a shaft 41 which also has a splined or telescoping connection 42 with a shaft 43 leading into the housing of the gear box. Inside the housing, reduction gearing indicated generally at 44 connects the shafts 43 and 36 together. Assuming that both worms have threads of the same hand, the reduction gearing comprises gear 44ª, idler gear 44ᵇ and 44ᶜ, and the final gear 44ᵈ, in a ratio corresponding to the ratio of the teeth of the roughing and finishing worm gear sets so that the angular velocity of the table whether driven by roughing or by the finishing worm, is the same.

Fig. 3 of the drawings illustrates a drive arrangement whereby the idler gear 44ᵇ and 44ᶜ in the reduction gearing may be eliminated. In this figure the two worms 32ª and 33ª are indicated as having threads of opposite hand and may therefore be reversely rotated (by gears 44ª and 44ᵈ directly) to effect the same direction of table movement.

From the foregoing it is evident that the roughing and finishing worms 33 and 32 are continuously driven in parallel and continuously meshing with their respective gear wheels. However, it is not the purpose or the objective of the present invention to have the two worms act as driving agents simultaneously. The invention contemplates that only one of the worm gears 32 or 33 shall constitute the drive to the table at any one time, and to accomplish that end in a simple manner without the use of the so-called drop worm arrangements or without resort to changing center distances which would serve only to complicate the construction and timing.

Figure 8:
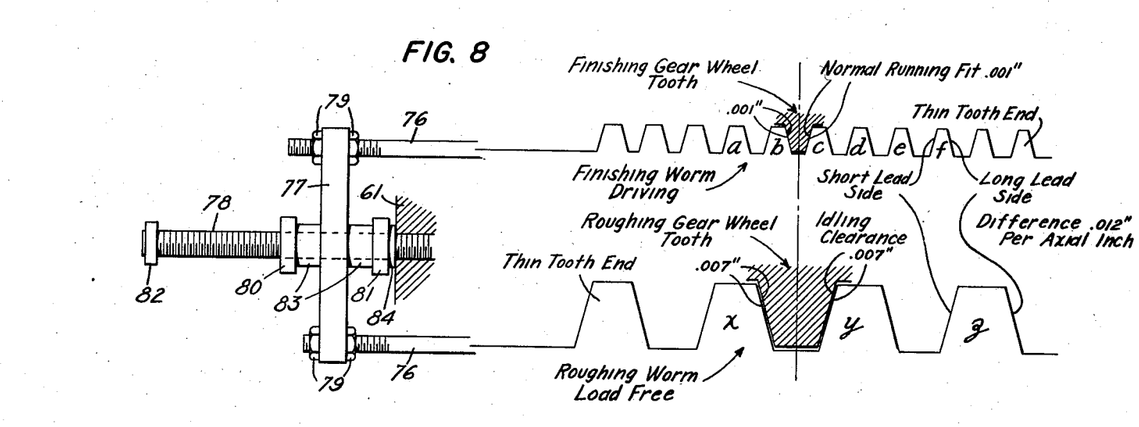
Figs. 8 and 9 are schematic diagrams of the worm and worm wheel relation in different operating positions of the worm.

As illustrated in Figs. 4 and 8, each of the worm gears 32 and 33 is formed with a helical thread 52 and 53 respectively thereon, which progressively increases in axial thickness from one end to the other. With regard only to the finishing worm 32, one side 52ª of the thread thereon is formed with the standard and uniform lead, whereas, the other side 52ᵇ of the same thread is formed with a different standard and uniform lead so that the combination of long and short leads produces a thread that increases in thickness at a constant rate from one end to the other. And conversely, the spaces between the convolutions of the thread decrease in width at the same rate in the same direction. The roughing worm 33 has its thread 53 formed in the same manner but is, it will be understood, of a relatively coarse pitch. The worm gears 30 and 31 are each formed with standard worm teeth complemental to the pitch of their associated worm gears 32 and 33.

In the interest of simplicity and compactness, the worm gears 32 and 33 are arranged preferably side-by-side on parallel axes and with the thinner portion of the thread of one worm axially opposite the thicker portion of the thread of the other worm, as illustrated more clearly in Fig. 4. It will be evident, therefore, that if one of the worms is shifted in the direction of its axis, the teeth of its related gear wheel may be caused to engage either the thinner or the thicker portion of the thread of the worm, depending upon the direction of axial shift. With a worm thread of this character one may wilfully inject a large amount of backlash into the worm drive or eliminate it entirely. On the other hand, if both worms are moved simultaneously in the direction of their axes so as to effect the converse relation between their threads and the teeth of their respective gear wheels, the exaggerated clearance may be selectively shifted from one gear to the other, and the running fit or true driving relation established between worm and worm wheel of the selected worm gear set, thereby to constitute one or the other of the driving worms the exclusive table driving agent. In such a case, it will be seen, the thicker portion of the thread of one of the worms is caused properly to mesh with the teeth of its related wheel, whereas, the undersized portion of the thread of the other worm, which is also in mesh with the teeth of its wheel, does not contact with the teeth of the wheel and does not, therefore, carry any part or portion of the driving load.

The converse action results when the worms are shifted simultaneously in their opposite axial directions. In that event the portions of the worm thread that had been revolving in the clear between teeth of its associated worm wheel, has now been increased to its full normal size and operatively engages with the teeth and becomes the driver. At the same time that portion of the thread of the opposite worm that was the driving agency before, will now have become undersized in thickness and will turn load-free in spaced relation with the teeth of its associated wheel.

Figure 9:
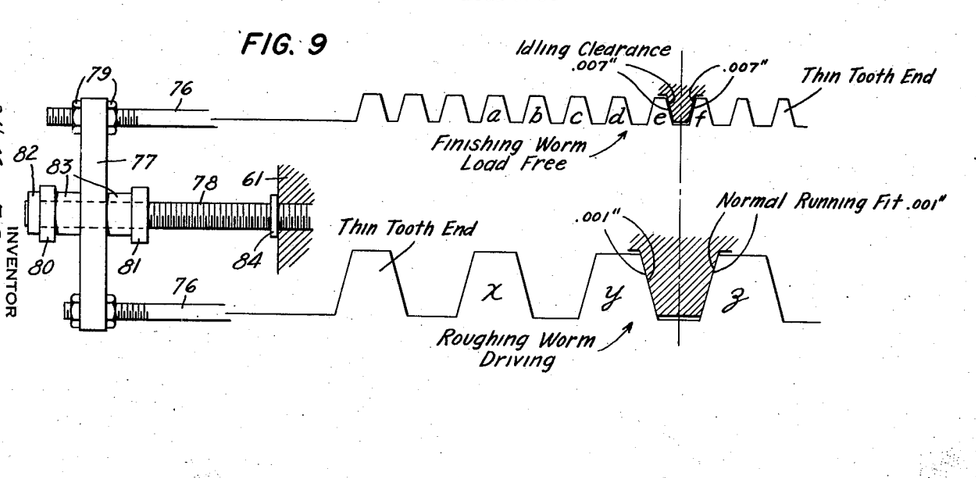

These relations will be more readily understood if a given set of tooth clearances are adopted. Assuming that the relative dimensions of the two pairs of worms and gears are as illustrated in Figs. 8 and 9, and that the difference between the standard lead and short lead of the thread on each of the worm gears is .012" per inch. Assuming further that the total normal running clearance of the driving worm thread is .002" and it is desired that there should be a total clearance of .014" between the thread of the idling worm and its gear teeth. Neglecting the factor of the normal running clearance in both instances, the net change is .012" which in this particular example corresponds to the rate of divergence per axial inch of the leads of each of the worm threads. Hence, an axial shifting of each worm through a distance of 1" is required to cause the thread of one of the worms to run idle between the teeth of its gear with a total clearance of .014" while the other worm is brought into proper driving relation with the teeth of its gear and its normal running clearance of .001" on each side of the thread.

The manner in which the roughing and finishing worms are mounted and the means for effectuating the axial shifting, is disclosed more particularly in Figs. 2, 4, 5 and 6. In these figures, the table base 11 is provided with a lateral opening 60 which is covered by a guide and supporting plate 61. The inner surface 62 of the plate has formed therein two tapered slots 63 and 64 located laterally opposite the worm wheels 30 and 31, respectively, and in the general planes thereof. Shiftable worm thrust bearing blocks 65 and 66 are fitted accurately to the tapering guides 63 and 64 and inner face 62 of the supporting plate.

The worm shafts are non-translatably mounted in the shiftable bearing blocks 65 and 66 at one side of the drive worms, and slidably journaled in normally fixed bearing blocks 67 and 68 at the opposite side of the worms. The two sets of bearings are assembled, as will hereinafter be explained, to maintain the axes of the worms in their correct relation with the respective worm gears at all times.

The finishing worm 32 shoulders against a thrust bearing 69 which in turn bears against the end face of the block 65 and a similar thrust bearing 70 held in place by a locking collar 71, is provided at the opposite face of the bearing 65. Thus, the axial thrust in the worm shaft 34, incident to the propelling of the table, irrespective of the hand of the worm or its direction of rotation, is in this manner transmitted to the bearing block 65. The mounting of the roughing worm shaft 41 in its bearing block 66 is similar to the mounting of the finishing worm and need not, it is believed, be explained in detail.

A convenient means for securing the bearing blocks 65 and 66 to the supporting plate in a manner affording lateral adjustment thereof comprises a set of T-bolts 72 for each bearing. The heads of the bolts operate in pairs of T-slots 73 provided in each bearing block and pass through holes 74 in the supporting plate. Alternatively, pairs of threaded studs may be riveted to straps movable in the T-slots, thereby to increase the clamping area. Clamp nuts 75 are applied to their outer ends and when loosened, each bearing block may be shifted laterally to effect a corresponding axial shifting of the worm and worm shaft carried thereby.

Means have been provided for shifting the encased worms independently and collectively as will now be explained. Referring to Figs. 2 and 3, each bearing block has an operating shaft 76 secured thereto which extends parallel to the tapering guides, through holes in the supporting plate, and projects from the end thereof. The adjusting rods are connected at their outer ends by a bracket 77 that is slidably mounted upon a threaded stud 78 which is also mounted in the supporting plate 61. Each adjusting rod, is however, independently adjustable relative to the bracket 77 by means of check-nuts 79 threaded to the shafts at each side of the bracket. By backing off one nut and advancing the other, the associated shaft 76 and parts connected therewith, i. e., bearing block, worm shaft and worm, may be adjusted axially relative to the other, thus properly to correlate the thread of the worm with the teeth of its associated worm wheel. When each worm has been properly correlated, both worms may be shifted axially collectively, by shifting the bracket 77 along the stud 78.

The threaded stud 78 has mounted thereon two nuts 80 and 81 located at opposite sides of the bracket 77. The outer end of the stud 78 carries an adjustable, but normally fixed, nut 82. Extending bearing portions 83 are provided on the common adjusting bracket 77 between the nuts 80, 81 to maintain the bracket square with the shaft 78. By backing off on the nut 80 and advancing the nut 81, the bracket 77 is shifted and simultaneously, both of the driving worms.

In the position illustrated in Figs. 4 and 8, the common adjusting means is against a fixed shoulder 84 on the stud and the finishing worm 32 is properly related to its gear and is the driving agent. When the common shifting member 77 has been adjusted to its other extreme position, (Fig. 9) the worms will have been shifted axially to establish the converse relation, i. e., the roughing worm 33 is in proper position as the driving agent, whereas, the finishing worm 32 runs idle and load free.

By the provision of independent and collective adjusting means above explained, the proper relation between the worms and their associated gears may be initially established and maintained, and when so established, the mechanism may be operated selectively to shift the driving load from one worm to the other and the machine operated without danger of the teeth of the idly running worm and worm gear rubbing together and consequently wearing.

During the operation of shifting the worms 32 and 33 axially, to transpose the driving load from the roughing worm gear set to the finishing worm gear set, or conversely, each of the worms continues in mesh with its respective gear and normally would effect an angular movement of the table. However, because of its massiveness and the weight of the workpiece thereon, the table ordinarily will not move angularly under the manual urge of shifting the worms, and it is moreover preferable to rotate the worms so that they screw themselves load free tangentially along their gears. For this purpose a hand wheel 35ᵃ is mounted upon one of the worm shafts, preferably the faster running finishing worm shaft 34, which may be manually operated to effect the screwing operation, either in or out, as the case may be. Meanwhile, the reversing mechanism 37—40 for the worm drive shafts has been placed in neutral so that only the worm shafts are rotated and not the entire hobbing machine transmission.

This disconnecting of the worm drive and subsequent rotating thereof relative to the main transmission, may disrupt the phase angle relation of the table to the hobbing cutter. However, inasmuch as this relation will already have been disrupted by virtue of the changing of the hobs themselves (from a roughing cutter to a ground finishing cutter) the change in phase incident to shifting the worms, is not consequential. Usually the roughing hob is a double or a triple lead cutter, whereas, the finishing hob is a single lead cutter accurately made and ground true to size and tooth form. In operation, therefore, faster table speeds may be used in roughing than in finishing, and the change over from roughing to finishing requires not only different cutters and new speed ratios throughout the machine (effected by pick-off change gear mechanisms in the gear box) but extremely careful and precise setting of the finishing hob (angularly and axially) with respect to the roughed-out teeth of the gear blank. Accordingly, any change in phase, by virtue of the act of worm shifting, is incidental and, moreover, rectified in the positioning of the finishing hob.

As herein before mentioned both of the worm gears 32 and 33 are journaled in their bearings with their axes definitely properly related to their respective worm wheels, and this initial and true relation of their centers does not change during the operation of compensating for wear upon the teeth, or during the operation of shifting the drive from one worm to the other. When the worms are initially assembled into the machine, the proper worm and worm wheel relation is established as follows:

The bearing blocks 65 and 67 are assembled on the worm shaft and then fitted and bolted fast to the supporting plate 61. The supporting plate 61 is then fitted to the opening 60 in the table base and by means of shims 85 and 86, adjusted laterally and vertically to position the axis of the worm accurately in its proper position relative to the plane and axis of the finishing gear 30. Bolts 87 operating through clearance holes 88 in the cover plate are provided for securing the plate and parts connected thereto firmly in position.

After the finishing worm has been properly located, the roughing worm 33 is attached to the supporting plate 61. The axis of the roughing worm is properly located by making the bearing block 66 preferably in two parts 66ᵃ and 66ᵇ. The section 66ᵃ of the bearing block of the roughing worm is fitted to the tapering guides 64 in the supporting plate and has bolted thereto the bearing section 66ᵇ. Shims 89 of the thickness required to locate the axis of the roughing worm accurately with respect to the axis of roughing gear wheel 31, are provided between the engaging faces of the two sections and by means of bolts 90 the parts are clamped together with the axis of the roughing worm in its proper vertical and laterally adjusted position. Thereafter taper pins 91 are driven into position thereby positively locking the two sections in the predetermined position established. The outer bearing block 68 is fitted directly to the supporting plate 61, in alignment with the slidable bearing 66.

By this method of assembling first one worm with its gear, and then the other with its gear and relative to the first worm, attainment of the high degree of accuracy essential in the table drive is definitely assured.

It will be understood that the two worms are assembled upon the supporting plate 61 in their approximately correct longitudinal positions relative to the center lines of their associated gears and any axial adjustment required properly to correlate the thread of each worm with the teeth of its associated wheel, for the purpose herein above explained, is made by shifting the bearing blocks, worms, and worm shafts axially as independent units, through the independent adjusting means 76, 77 and 78 herein before referred to. Compensating adjustments, to take up wear is effected in the same manner and in practice, it has been found that provision may be made for 10 years wear before the accuracy of the worm is impaired or its axial readjustment too great to be practical.

The general operation of the machine will now be explained: The operator first mounts the gear blank 18 upon the work fixture on the table and, after centering the blank so that it runs true, will clamp it firmly in position. A roughing hob 15 will be mounted on the cutter carriage and the stanchion 13 shifted toward the work blank thereby properly to position the hob with respect to the pitch line of the gear teeth to be cut. The operator, having made the required changes to the gearing in the gear box 16 and having withdrawn the finishing worm gear 32 from contact with its worm wheel, will then start the machine in operation. When the gear blank has had the teeth thereon roughed out to the desired length, the machine is stopped and the roughing hob removed. The operator will next place the table driving gear 37 in its neutral position and after unclamping the worm journals 65 and 66, manually rotate the shafts 34 and 41 and shift the worms axially.

Figure 7:
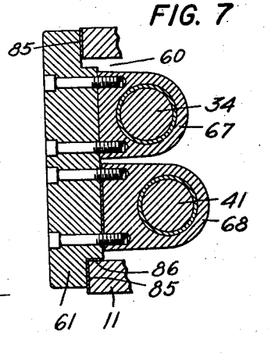

The extent of axial shifting depends, of course, upon the relative axial positions initially established between the two worms. In the example herein given the extent of shift to effect a complete disengagement of one worm and the equally complete engagement of the other will be one-inch. The stops 82 and 84 associated with the worm adjusting mechanism affords a convenient means for determining the extent of axial shift and when the collar 81 of the adjusting mechanism has been brought against the stop 84, the roughing worm 33 will have been shifted to the position indicated in Figs. 3 and 7 and the thread thereof will amply clear the teeth of its associated worm wheel. Simultaneously the finishing worm 32 will have been shifted into driving position. The worm journals are thereafter clamped firmly to the supporting plate 61 to maintain the new driving relation and the shiftable gear 37 repositioned to establish the power drive. The user will then mount a finishing hob on the cutter carriage and after making such speed changes as may be required in the main transmission, accurately line up the finishing hob with the spaces that have been roughed out in the workpiece. Any maladjustment that may have occurred by virtue of the shifting of the table drive worms is rectified as an incident to the lining up of the finishing hob, and the machine is ready to perform the finishing operation.

During the finishing operation the table is propelled solely by the fine pitched finishing worm 32 while the roughing worm 33 runs idle and in the clear. The converse is true during the roughing operation on the gear blank for in that case the finishing worm is definitely withdrawn from tooth contact with its wheel, whereas, the roughing worm is making tooth contact and performing the function of driving the table.

From the foregoing it will be perceived that a worm gear drive is provided whereby it is possible to attain the highest degree of accuracy in table movements, and by using parallel driven worm gears provided respectively with progressively increasing and diminishing threads, a worm drive capable of having the load shifted selectively from one to the other with the entailment of minimum degree of error, is made possible. It will be understood that while the principle of the invention has been explained in connection with two parallel shafts, for example, shafts 41 and 34 and oppositely positioned worms, it is obvious that angularly or coaxially related shafts with worms arranged with their threads progressing in the same or in opposite directions may be employed.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A worm drive for a rotary table comprising a pair of worm wheel gears secured to the table; a pair of axially shiftable worm gears each adapted to coact with one of the gears on the table; and means for shifting said worm gears axially selectively to position one or the other thereof in cooperative relation with the teeth of its related worm wheel.

2. A worm drive comprising a pair of worm wheel gears coaxially mounted upon a member to be driven; a pair of axially shiftable worm gears each adapted to mesh with the teeth of one of the said worm wheel gears; power means for rotating said worm gears at different speeds; and means for shifting said worm gears axially selectively to position one or the other thereof in driving relation with its associated worm wheel.

3. A worm drive for a rotary table comprising a pair of worm wheel gears secured to the table; a pair of axially shiftable worm gears permanently meshing with the gears on the table, each of said worm gears having a thread progressively diminishing in thickness from one end to the other; and means for shifting said worm gears axially selectively to position the thread of one in driving relation with its related worm wheel and the thread of the other in spaced relation with the teeth of its associated worm wheel.

4. A drive for a rotary table comprising two worm wheel gears secured to the table; two axially shiftable worm gears adapted permanently to mesh with the gears on the table, each of said worm gears having a thread thereon progressively diminishing in thickness from one end to the other; means for rotating said worm gears in synchronism; and means for shifting said worm gears axially selectively to position the thread of one of the worm gears in driving contact with the teeth of its related worm wheel.

5. A worm drive for a rotary member comprising two worm wheel gears secured to said member; two axially shiftable worm gears permanently meshing with the gears on the said member, each of said worm gears having a thread progressively diminishing in thickness from one end to the other; means rotatively mounting said worm gears on fixed axes with the thinner portions of the thread of one axially opposite the thicker portions of the thread of the other; and means for shifting said worm gears axially selectively to position the thread of one in driving relation with the teeth of its related worm wheel and simultaneously to position the thread of the other in spaced relation with the teeth of its related worm wheel.

6. A worm drive for a rotary table comprising compound worm gears secured to the table, said gears including a coarse tooth gear and a fine tooth gear; two axially shiftable worm gears of complemental pitch permanently meshing with the gears on the table, each of said worm gears having a thread progressively diminishing in thickness from one end to the other; means mounting said worm gears on parallel axes with the thinner part of the thread of one axially opposite the thicker part of the thread of the other; and means for shifting said worm gears in the direction of their axes selectively to position the thread of one in driving relation with the teeth of its related worm wheel.

7. A worm drive for a rotary table comprising compound worm gears secured to the table including a coarse tooth gear and a fine tooth gear; two axially shiftable worm gears of complemental pitch permanently meshing with the gears on the table, each of said worm gears having a fixed axial distance relative to the axis of said compound gear and having a thread progressively diminishing in thickness from one end toward the other from normal to subnormal in size; means for shifting said worm gears axially selectively to position the normal size portion of the thread of one of said worm gears in driving relation with the teeth of its related worm wheel and to position the subnormal size portion of the thread of the other in load free relation with the teeth of its related worm wheel; and means for rotating said worm gears.

8. A worm drive for a rotatable member comprising a pair of worm wheels secured to said rotary member; a pair of axially shiftable worm gears, each having a thread thereon progressively diminishing in axial thickness toward one end and each positioned in meshing relation with the teeth of one of said worm wheels and with the thinner portion of the thread of one worm axially opposite the thicker portion of the thread of the other worm; means for shifting said worm gears tangentially relative to the worm wheels to position the thread of one of the worm gears in driving relation with its associated worm wheel and simultaneously to position the thread of the other worm gear out of driving contact with the teeth of its associated worm wheel; and means for clamping said worm gears in their axially shifted positions.

9. In worm gearing, the combination of a pair of worm wheels on a driven member; a pair of axially shiftable worm gears, each having a thread progressively diminishing in axial thickness toward one end permanently in mesh with the teeth of one of said worm wheels, said worm gears also being arranged on parallel axes with the thinner portion of one worm axially opposite the thicker portions of the other worm; movable journal bearings for each of said worm gears; bracket means for connecting said bearings together; power means for driving said worm gears; and means for shifting said bracket means thereby to shift said worm gears collectively axially to position the thread of one of the said worm gears into load carrying relation with the teeth of its associated gear wheel and the thread of the other out of load carrying relation with the teeth of its associated worm wheel.

10. In worm gearing the combination of a worm drive for a rotatable member comprising a pair of worm wheels; a pair of axially shiftable worm gears, each having a thread thereon progressively diminishing in axial thickness toward one end and each being mounted permanently to mesh with the teeth of one of said worm wheels with the thinner portion of the thread of one worm axially oppositely the thicker portions of the thread of the other worm; means for shifting one of said worm gears in an axial direction relative to the other to position the thread thereof in a preselected position relative to the teeth of its related worm wheel; and means for shifting said worm gears collectively in an axial direction thereby to position the thread of one of the worm gears in driving relation with the teeth of its associated worm wheel and simultaneously to position the thread of the other worm gear out of contact with the teeth of its associated worm wheel; and means for driving said worm gears synchronously.

11. A drive transmission for a rotary member comprising a worm wheel secured to the member to be rotated; a worm gear having a thread thereon progressively diminishing in thickness from one end to the other arranged in meshing relation with the teeth of said worm wheel; axially shiftable thrust bearings for said worm gear; means for shifting said thrust bearings and worm gear in the direction of their axes to position the thread thereof selectively into or out of load carrying relation with the teeth of said worm wheel; and separate means for rotating the said member and worm wheel when the thread of said worm gear is out of contact with the teeth of said wheel.

12. A drive transmission for a rotary member comprising a worm wheel; a worm gear having a thread thereon progressively diminishing in thickness from one end to the other arranged in meshing relation with the teeth of said worm wheel; axially shiftable thrust bearings for said worm gear; means for shifting said thrust bearings and worm gear in the direction of their axes to position the thread of the worm in spaced relation with the teeth of said worm wheel; additional means for rotating the said member when the thread of said worm gear is out of contact with the teeth of said wheel; and means for rotating said worm gear in synchronism with the movement of the teeth of said worm wheel to maintain said spaced relation.

13. A drive transmission for a rotary member comprising a pair of worm wheels secured to the member to be rotated; tangentially journaled worm gears, each having a thread thereon progressively diminishing in thickness from one end to the other and arranged in reversed relation permanently in mesh with the teeth of one of said worm wheels; and means for shifting said worm gears in the direction of their axes conversely to position their respective threads selectively into or out of contact with the teeth of their associated worm wheels.

14. A drive transmission for a rotary member comprising a pair of worm wheels secured to the member to be rotated; tangentially journaled worm gears, each having a thread thereon progressively diminishing in thickness from one end to the other and arranged in reversed relation permanently in mesh with the teeth of one of said worm wheels; power means for rotating said worm gears synchronously; means for shifting said worm gears collectively in the direction of their axes to a predetermined position conversely to position their respective threads selectively into and out of driving contact with the teeth of their associated worm wheels; and means for shifting said worm gears relative to each other in an axial direction to compensate for wear.

15. A worm drive for a rotary table comprising compound worm gears secured to the table, said gears including a coarse tooth gear and a fine tooth gear; two axially shiftable worm gears of complemental pitch permanently meshing with the gears on the table, each of said worm gears having a thread progressively diminishing in thickness from one end to the other; power means for rotating said worm gears at speeds corresponding to the ratio of said coarse and fine tooth gear wheels; means mounting said worm gears with the thinner part of the thread of one axially opposite the thicker part of the thread of the other; and means for shifting said worm gears in the direction of their axes selectively to position the thread of one in driving relation with the teeth of its related worm wheel and simultaneously to position the thread of the other in non-contacting relation with the teeth of its related worm wheel.

16. A worm drive for a rotary table comprising a pair of worm wheel gears secured to the table; a pair of axially shiftable dual lead worm gears each adapted to cooperate with one of the gears on the table; means for shifting said worm gears collectively axially to a predetermined position selectively to position one or the other thereof in cooperative relation with the teeth of its related worm wheel; and separate means for shifting one of said worm gears relative to the other thereby to position a different portion of the thread thereof in position to cooperate with the teeth of its associated gear wheel when said gears are shifted to said predetermined position.

17. A worm drive mechanism comprising a pair of coaxially mounted differently pitched worm wheel gears secured to a member to be driven; a pair of axially shiftable dual lead worm gears each adapted to mesh with the teeth of one of the said worm wheel gears; means for shifting said worm gears axially selectively to position the thread of one or the other thereof in load carrying relation with its associated worm wheel; and means for rotating said worm gears at speeds ratioed to correspond with the pitch of said gear wheels whereby said member will be driven at a given speed irrespective of which of said worm gears is the driver.

18. A worm drive for a rotary table comprising a pair of worm wheel gears secured to the table; a pair of axially shiftable worm gears permanently meshing with the gears on the table each of said worm gears having a thread progressively diminishing in thickness from one end to the other and with the diminishing thread of one arranged axially opposite the diminishing thread of the other; means for shifting said worm gears collectively axially selectively to position the thread of one or the other thereof in load carrying relation with its related worm wheel; and independent means for shifting each of said worm gears relative to each other to position a different portion of their threads in position to cooperate with the teeth of its related gear wheel when said worm gears are collectively shifted.

19. A drive for a rotary member having a worm wheel gear secured thereto comprising two axially shiftable worm gears, each of said worm gears having a thread progressively diminishing in thickness from one end to the other; and means for shifting said worm gears axially selectively to position the thread of one in driving relation with the thread of the other in non-contacting relation with the teeth of the gear on said member.

20. A worm drive for a rotary member comprising two worm wheel gears coaxially secured to said member; two axially shiftable worm gears permanently meshing respectively with the gears on the said member; each of said worm gears having a portion of its thread undersize in thickness; means rotatively mounting said worm gears on fixed axes with the undersized portion of the thread of one axially opposite the normal sized portion of the thread of the other; and means for shifting said worm gears axially selectively to position the normal portion of the thread of one in driving relation with the teeth of its related worm wheel and to position the undersized portion of the thread of the other in spaced relation with the teeth of its related worm wheel.

21. A worm drive having in combination two worm gear wheels secured to a member to be driven, an adjustable driving worm gear normally meshing continuously with the teeth of each one of said gear wheels, means for driving said worms in synchronism, and means for adjusting one of said worm gears into driving contact with the teeth of its related worm wheel and simultaneously adjusting the other of said worm gears out of driving contact but not out of mesh with the teeth of its related wheel.

22. A driving transmission having in combination two driven gear elements, two driving gear elements meshing respectively with the driven gear elements, means mounting each one of the gears of one of said sets of elements for movement relative to its related gear but not out of meshing relation therewith to increase or decrease the tooth clearance between related driving and driven gears; and means for conversely adjusting both adjustable gears thereby to transpose the drive electively from one pair of driving and driven gears to the other.

23. A selective but constant speed driving transmission having in combination two differently pitched sets of gear elements for propelling a member, each set comprising a driven gear and a driving gear continuously maintained in phase relation therewith, means mounting one of the gears of each of said sets for movement relative to its related gear selectively into or out of proper driving relation therewith; and means for simultaneously adjusting the adjustable gears of said sets in converse directions relative to their respective associated gears thereby to effect complete transposition of the load from one of said sets of driving and driven gears to the other unaccompanied by any change in speed in the driven elements.

24. In worm gearing the combination of two differently pitched worm gear wheel elements secured to a member to be driven; two complementary pitched driving worm gear elements continuously maintained in phase relation with their respective worm gear wheels, power means for rotating said worm gears in synchronism; means mounting each one of the worm gears for movement relative to the teeth of its related worm wheel selectively into or out of proper driving relation therewith, and means for conversely shifting said adjustable worm gears simultaneously thereby to effect a drive electively through one of said worms to the exclusion of the other, without change in speed of the driven member.

25. In worm gearing the combination of two worm gear wheels secured to a member to be driven, two adjustable driving worm gears, each adapted to mesh with the teeth of one of said gear wheels and maintained continuously in phase therewith, a power shaft common to both of said worm gears and connections therewith for driving said worms in synchronism, means operable to adjust one of said worm gears into proper driving relation with the teeth of its related worm wheel, and means for adjusting the other of said worm gears out of driving relation and out of contact with the teeth of its related wheel while maintaining said phase relation thereby to effect the complete transfer of the driving load from one of said worms to the other unaccompanied by a change in speed of the driven member.

26. A worm drive transmission combining two worm gear wheels secured to a member to be driven, two shiftable driving worm gears, each adapted to be positioned in proper driving relation with the teeth of one of said gear wheels and to be maintained continuously in phase therewith, means for driving said worms; one of said worm gears normally occupying an effective driving position in relation to its related worm wheel and the other of said worms normally occupying a position ineffective for driving in relation to its related worm wheel; means for conversely adjusting said worm gears into effective and ineffective driving positions thereby to transfer the driving load exclusively from one worm to the other unaccompanied by any change in output speed of the driven member.

27. A worm drive having in combination two worm gear wheels secured to a member to be driven, two adjustable driving worm gears, each having a thread adapted to be positioned in driving relation with the teeth of one of said gear wheels and to be maintained continuously in phase therewith, means for driving said worms in synchronism, means for adjusting one of said worm gears into driving relation with the teeth of its related worm wheel, and means for adjusting the other of said worm gears out of driving relation and out of contact with the teeth of its related wheel.

28. A driving transmission having in combination two differently pitched driven gear elements, a driving gear element associated with each driven gear and continuously maintained in phase relation therewith, means mounting each of the said driving gears for movement selectively into or out of proper driving relation with its related gear, and means for adjusting the one of the adjustable gears out of driving relation and out of contact with the teeth of its related gear when the other of said adjustable gears is the driving agent; and means maintaining the said phase relation of the driving and driven gears irrespective of which driving gear occupies the position of driver.

29. In worm gearing the combination of at least two worm gear wheels secured to a member to be driven, at least two adjustable driving worm gears, each selectively adapted to be positioned in driving relation with the teeth of one of said gear wheels, means for driving said worms and for maintaining said worms continuously in phase with their respective gear wheels; means for adjusting one of said worm gears into driving relation with the teeth of its related worm wheel and simultaneously adjusting the other of said worm gears out of driving relation and out of contact with the teeth of its related wheel thereby electively to place the entire driving load on the said one of said worm gears and definitely to relieve the others from wear while idling.

30. A worm drive transmission combining two worm gear wheels secured to a member to be driven, two axially shiftable driving worm gears, each having a thread diminishing in axial thickness and continuously in mesh with the teeth of one of said worm wheels; means for driving said worms in synchronism, one of said worm gears normally occupying an axial position effective properly to drive its related worm wheel and the other of said worms normally occupying a position ineffective properly to drive its related worm wheel; means for conversely shifting said worm gears into effective and ineffective driving positions thereby to effect a transfer of the driving load exclusively from one worm to the other.

31. A worm drive having in combination two worm gear wheels secured to a member to be driven, two axially adjustable driving worm gears, each having a thread adapted to be positioned in driving relation with the teeth of one of said gear wheels; said worm gears being axially offset from each other a distance substantially equal the axial length of one of said worms, means for driving said worms in synchronism, means for adjusting one of said worm gears axially into driving relation with the teeth of its related worm wheel, means for adjusting the other of said worm gears out of mesh with the teeth of its related wheel; and means continuously maintaining the idling worm in phase relation with its related wheel.

32. A driving transmission having in combination a coarse pitched gear and a fine pitched gear secured to a member to be driven; a complementary pitched driving gear associated with each of said driven gears; power means for rotating said driving gears including connections between the driving gears ratioed in accordance with the pitch relation of the gears to maintain each of the gears continuously in phase with its associated driven gear; means mounting each of the said driving gears for movement in the direction of its axis selectively into or out of driving relation with its associated gear, means for adjusting one of the adjustable gears out of driving relation and out of tooth contact with the teeth of its related gear when the other of said adjustable gears is positioned to function as the member driving agent; and means maintaining said phase relation between the respective driving and driven gears of both of said sets of gears irrespective of which driving gear is functioning as the member propelling agent.

33. A transmission including two bodily adjustable and differently pitched worm gears; a complementary pitched worm wheel continuously in mesh with each of said gears; a member to be driven by said wheels; means for rotating said gears continuously including a power source and connections between said gears ratioed in exact proportion to the pitch relation of said worm gears; and means operable to conversely adjust said worm gears into proper driving relation with their respective wheels thereby to render one of said gears the exclusive driving agent for said member.

34. A drive mechanism combining two differently pitched worm gear wheels secured to a member to be driven; two driving worm gears continuously maintained in phase relation with their respective driven gear wheels, power means for rotating said worm gears at a ratio corresponding to their pitch ratio; a shiftable bearing bracket for mounting each of the worm gears for movement relative to the teeth of its related gear wheel selectively into or out of normal running position therewith, means for conversely shifting said brackets simultaneously thereby to effect the rotation of said member electively through either one of said worms to the exclusion of the other, without change in speed of the driven member; and means for clamping said brackets in their adjusted positions.

35. A drive transmission combining two worm wheels secured to a single member to be rotated, two adjustable driving worm gears, each adapted to mesh with the teeth of one of said gear wheels and to be maintained continuously in phase therewith, a power shaft and connections therewith for driving said worms at an angular velocity inversely proportionate to their pitches; means operable to adjust the thread of one of said worm gears into full driving relation with the teeth of its related worm wheel, and means for adjusting the other of said worm gears slightly out of full driving relation with the teeth of its related wheel to effect the complete transfer of the driving load from one of said worms to the other without varying the speed of the driven member.

36. A worm drive transmission combining two worm wheels secured to a member to be driven, a driving worm for each gear wheel, means for rotating said worms at a ratio corresponding to the ratio of their leads, and means for artificially increasing the clearance between the thread of either of said worms and the teeth of its gear wheel to confine the driving load exclusively to the other of said worms, and means for adjusting said worms independently to compensate for wear.

WILLIAM F. ZIMMERMANN.